US012567356B2

(12) United States Patent
Hong et al.

(10) Patent No.: US 12,567,356 B2
(45) Date of Patent: Mar. 3, 2026

(54) DRIVING DEVICE AND DRIVING METHOD OF ELECTROLUMINESCENCE DISPLAY APPARATUS

(71) Applicant: LG Display Co., Ltd., Seoul (KR)

(72) Inventors: Moo Kyoung Hong, Paju-si (KR); Ui Taek Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/960,866

(22) Filed: Nov. 26, 2024

(65) Prior Publication Data

US 2025/0218341 A1 Jul. 3, 2025

(30) Foreign Application Priority Data

Dec. 29, 2023 (KR) ........................ 10-2023-0197056

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01); *G09G 2320/0252* (2013.01); *G09G 2330/02* (2013.01)

(58) Field of Classification Search
None
See application file for complete search history.

(56) References Cited

U.S. PATENT DOCUMENTS

| | | | | |
|---|---|---|---|---|
| 6,570,345 | B1 * | 5/2003 | Munson | H05B 39/044 315/297 |
| 9,030,481 | B2 * | 5/2015 | Kwa | G09G 5/395 345/545 |
| 9,633,599 | B2 * | 4/2017 | Ohara | G09G 3/3266 |
| 10,089,932 | B2 * | 10/2018 | Tsuge | G09G 3/3258 |
| 10,332,449 | B2 * | 6/2019 | Zhou | G09G 3/3233 |
| 10,546,548 | B2 * | 1/2020 | Cheng | G09G 3/3618 |
| 10,861,392 | B2 * | 12/2020 | Yokoyama | G09G 3/3258 |
| 11,017,730 | B2 * | 5/2021 | Hwang | G09G 3/3291 |
| 11,804,157 | B2 * | 10/2023 | Kim | G09G 3/3291 |
| 12,033,587 | B2 * | 7/2024 | Lee | B60K 35/60 |
| 12,057,055 | B2 * | 8/2024 | Lee | G09G 3/3233 |
| 12,142,216 | B2 * | 11/2024 | Park | G09G 3/3233 |
| 2003/0160580 | A1 * | 8/2003 | Munson | H05B 39/044 315/291 |
| 2005/0007027 | A1 * | 1/2005 | Fryer | G09G 3/12 315/169.3 |

(Continued)

*Primary Examiner* — Fred Tzeng
(74) *Attorney, Agent, or Firm* — Fenwick & West LLP

(57) ABSTRACT

An electroluminescent display apparatus includes a display panel including a plurality of pixels configuring a screen, a host system configured to output a first enable signal toggled based on an input of a power-off command signal and a second enable signal toggled based on an input of a power-on command signal, and a timing controller configured to change a display mode, which is for displaying an input image on the screen of the display panel, to an off sensing mode for sensing an electrical characteristic value of each of the plurality of pixels, based on the first enable signal, and activate a quick start mode for stopping the off sensing mode and shortening a restart time of the display mode when the second enable signal is input while the off sensing mode is being performed.

24 Claims, 7 Drawing Sheets

(56) References Cited

U.S. PATENT DOCUMENTS

| | | | | |
|---|---|---|---|---|
| 2013/0050171 | A1* | 2/2013 | Tsai | G09G 3/3648<br>345/212 |
| 2017/0006688 | A1* | 1/2017 | Dai | H02M 1/42 |
| 2017/0092185 | A1* | 3/2017 | Lee | G09G 3/2092 |
| 2019/0295469 | A1* | 9/2019 | Umezawa | G09G 3/3233 |
| 2020/0098316 | A1* | 3/2020 | Yokoyama | G09G 3/3275 |
| 2020/0251056 | A1* | 8/2020 | Huang | G09G 3/2096 |
| 2023/0137365 | A1* | 5/2023 | Hong | G09G 3/3291<br>345/690 |

* cited by examiner

DRIVING DEVICE AND DRIVING METHOD OF ELECTROLUMINESCENCE DISPLAY APPARATUS

CROSS-REFERENCE TO RELATED APPLICATION

This application claims the benefit of the Republic of Korea Patent Application No. 10-2023-0197056 filed on Dec. 29, 2023, which is hereby incorporated by reference in its entirety.

BACKGROUND

Field of Technology

The present disclosure relates to an electroluminescent display apparatus and a driving method thereof.

Discussion of the Related Art

Each of pixels of electroluminescent display apparatuses includes a light emitting device self-emitting light and a driving element, and each pixel controls a driving current flowing in a driving element with a data voltage based on a gray level of image data to adjust luminance.

Electroluminescent display apparatuses perform an on process of turning on a screen of a display panel, based on a power-on command signal input from outside the display apparatuses, and an off process of turning off the screen of the display panel based on a power-off command signal input from outside the display apparatuses. When the power-on command signal is input while the off process is being performed, because the on process should start after the off process is completed, a screen restart time for turning on the screen increases.

Particularly, when an off sequence sensing operation of sensing the electrical characteristic of pixels is performed in the off process, the screen restart time may further increase.

SUMMARY

To overcome the aforementioned problem of the related art, the present disclosure may provide an electroluminescent display apparatus and a driving method thereof, in which a screen restart time may be shortened in a case where a power-on command signal is input while an off process is being performed.

In one embodiment, an electroluminescent display apparatus comprises: a display panel including a plurality of pixels; a host system configured to output a first enable signal that is toggled from a first level to a second level responsive to an input of a power-off command signal to power off the display panel and a second enable signal that is toggled from the first level to the second level responsive to an input of a power-on command signal to power on the display panel; and a timing controller configured to change a display mode of the display panel during which an input image is displayed by the display panel to an off sensing mode of the display panel during which an electrical characteristic value of each of the plurality of pixels is sensed responsive to the first enable signal toggling from the first level to the second level, and activate a quick start mode of the display panel that stops the off sensing mode and shortens a restart time from the off sensing mode to the display mode responsive to the second enable signal being toggled from the first level to the second level while the off sensing mode is performed.

In one embodiment, a driving method of an electroluminescent display apparatus including a host system, a timing controller, and a display panel including a plurality of pixels, the driving method comprises: outputting, by the host system to the timing controller, a first enable signal that is toggled from a first level to a second level responsive to an input of a power-off command signal to power off the display panel and a second enable signal that is toggled from the first level to the second level responsive to an input of a power-on command signal to power on the display panel; and changing, by the timing controller, a display mode of the display panel during which an input image is displayed by the display panel to an off sensing mode of the display panel during which an electrical characteristic value of each of the plurality of pixels is sensed responsive to the first enable signal toggling from the first level to the second level, and activating a quick start mode of the display panel that stops the off sensing mode and shortens a restart time from the off sensing mode to the display mode responsive to the second enable signal being toggled from the first level to the second level while the off sensing mode is performed.

In one embodiment, a display device comprises: a display panel including a plurality of pixels; a host system configured to output a first enable signal that is toggled from a first level to a second level based on an input of a power-off command signal to power off the display panel, a second enable signal that is toggled from the first level to the second level based on an input of a power-on command signal to power on the display panel, and a direct current (DC) power control signal; and a timing controller configured to change a display mode of the display panel during which an input image is displayed by the display panel to an off sensing mode of the display panel during which an electrical characteristic value of each of the plurality of pixels is sensed responsive to the first enable signal toggling from the first level to the second level, and activate a quick start mode of the display panel that stops the off sensing mode and switches to the display mode responsive to the second enable signal being toggled from the first level to the second level while the off sensing mode is performed, wherein the DC power control signal maintains a same level during the off sensing mode and the quick start mode, the level of the DC power control signal required for driving the display panel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
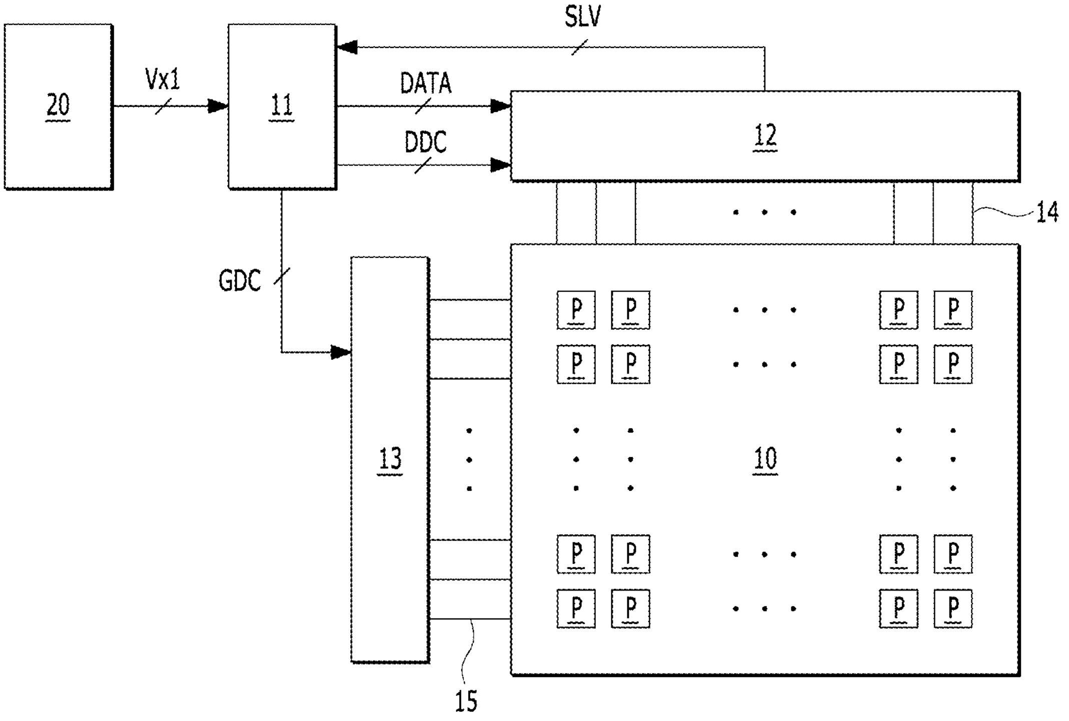
FIG. 1 is a block diagram illustrating an electroluminescent display apparatus according to one embodiment.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A scan signal (or a gate signal) applied to pixels may swing between a gate on voltage and a gate off voltage. The gate on voltage may be set to a voltage which is higher than a threshold voltage of a transistor, and the gate off voltage may be set to a voltage which is lower than the threshold voltage of the transistor. The transistor may be turned on in response to the gate on voltage and may be turned off in response to the gate off voltage. In N-channel transistors, the gate on voltage may be a gate high voltage (VGH), and the gate off voltage may be a gate low voltage (VGL). In P-channel transistors, the gate on voltage may be the gate low voltage (VGL), and the gate off voltage may be the gate high voltage (VGH).

Figure 2:
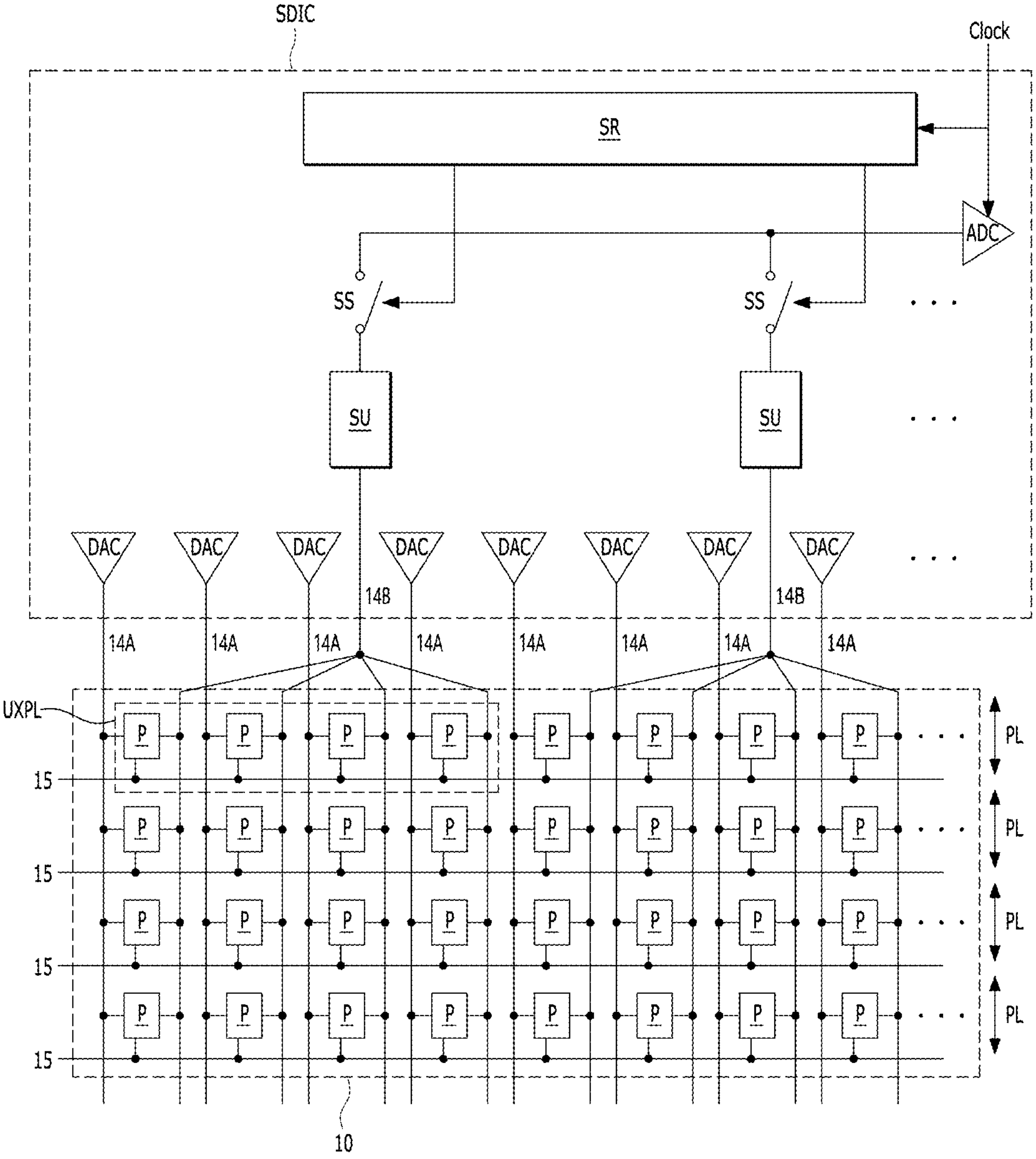
FIG. 2 is a diagram illustrating a connection configuration between a pixel array and a source driver integrated circuit (IC) according to one embodiment.

FIG. 1 is a block diagram illustrating an electroluminescent display apparatus according to one embodiment. FIG. 2 is a diagram illustrating a connection configuration between a pixel array and a source driver integrated circuit (IC) according to one embodiment.

Referring to FIGS. 1 and 2, the electroluminescent display apparatus according to one embodiment may include a display panel 10, a timing controller 11, a panel driving circuit, a sensing circuit, a power circuit, and a host system 20. The panel driving circuit may include a data driving circuit 12 and a gate driving circuit 13. The sensing circuit may be embedded in the data driving circuit 12.

In a screen displaying an input image in the display panel 10, first signal lines 14 extending in a column direction (or a vertical direction) may intersect with second signal lines 15 extending in a row direction (or a horizontal direction), and a plurality of pixels P may be respectively provided in a plurality of intersection areas and may be arranged as a matrix type to configure a pixel array. The first signal lines 14 may include a plurality of data lines 14A through which data voltages are supplied and a plurality of reference voltage lines 14B through which a reference voltage is supplied. The reference voltage lines 14B may connect the pixels P with the sensing circuit and may be referred to as a sensing line. The second signal lines 15 may be gate lines through which scan signals are supplied.

The pixel array may include a plurality of pixel lines PL. Here, the pixel line PL may not denote a physical signal line but may be defined as a pixel set of pixels of one line arranged adjacent to one another in a horizontal direction or defined as a pixel block of pixels of one line. The pixels P may be grouped into a plurality of groups and may implement various colors. When a pixel group for implementing colors is defined as a unit pixel UPXL, one unit pixel UPXL may include red (R), green (G), blue (B), and white (W) pixels. The R, G, B, and W pixels configuring the one unit pixel UPXL may be arranged adjacent to one another in a horizontal direction and may be designed to share the same reference voltage line 14B, and thus, the pixel array may be simplified.

The host system 20 be one of a television (TV), a set-top box, a navigation system, a personal computer (PC), a home theater system, a mobile device, and a wearable device.

The timing controller 11 may be connected to the host system 20 through an interface circuit. The timing controller 11 may correct video data DATA input from the host system 20 by using a pixel compensation value, and then, may supply corrected image data DATA to the data driving circuit 12. The pixel compensation value may be for compensating for a change in electrical characteristic value of each pixel P. The electrical characteristic value may denote a threshold voltage value of a driving element included in each pixel P. The electrical characteristic values of the pixels P may be obtained through an off-sensing mode.

The timing controller 11 may control a display mode, the off-sensing mode, and a quick start mode, based on a timing signal input from the host system 20. The timing controller 11 may include a gate timing control signal GDC for controlling an operation timing of the gate driving circuit 13 and a data timing control signal DDC for controlling an operation timing of the data driving circuit 12.

In the off-sensing mode, the timing controller 11 may calculate a pixel compensation value for compensating for a luminance change of each pixel, based on a characteristic sensing value input from the sensing circuit, and may store the pixel compensation value in a memory. In the display mode, the timing controller 11 may download the pixel compensation value from the memory and may correct the image data DATA by using the pixel compensation value to compensate for a threshold voltage deviation between the pixels P.

The data driving circuit 12 may include one or more source driver ICs SDIC. Each of the source driver ICs SDIC may include a latch array, a plurality of digital-to-analog converters DAC respectively connected to the data lines 14A, a plurality of sensing units SU respectively connected to the sensing lines 14B, a plurality of analog-to-digital converters ADC, a plurality of multiplex switches SS which selectively connect the sensing units SU to the analog-to-digital converters ADC, and a shift register SR which sequentially turns on the multiplex switches SS. The plurality of sensing units SU (e.g., sensing circuits) and the analog-to-digital converter ADC may configure a sensing circuit.

In the display mode, the latch array and the digital-to-analog converters DAC may be enabled.

The latch array may latch digital image data DATA input from the timing controller 11, based on the data timing control signal DDC, and may supply the latched digital image data DATA to the digital-to-analog converters DAC. The digital-to-analog converters DAC may convert the latched image data DATA into display data voltages and may supply the display data voltages to the data lines 14A.

In the off-sensing mode, the digital-to-analog converter DAC, the sensing units SU, and the analog-to-digital converters ADC may be enabled.

The digital-to-analog converters DAC may supply a predetermined sensing data voltage to the data lines 14A.

The sensing unit SU may supply a reference voltage Vpre to the sensing line 14B, based on the data timing control signal DDC, or may sense an electrical characteristic value of each pixel P input through the sensing line 14B and may supply the sensed electrical characteristic value to the analog-to-digital converter ADC. The analog-to-digital converter ADC may convert pixel sensing results of the sensing units SU into digital sensing values SLV and may transfer the digital sensing values SLV to the timing controller 11. Operations of the sensing units SU and the analog-to-digital converters ADC may be disabled in the display mode.

The gate driving circuit 13 may generate a scan signal (SCAN of FIG. 3) suitable for the display mode and the off-sensing mode, based on the gate timing control signal GDC, and may supply the scan signal to the gate lines 15. The scan signal may include a display scan signal which is output in the display mode and a sensing scan signal which is output in the off-sensing mode. An off-sensing operation may be performed during an on period of the sensing scan signal. The on period of the sensing scan signal may define an off-sequence sensing period which is performed in the off sensing mode. To secure desired sensing performance, the on period of the sensing scan signal may be sufficiently longer than an on period of the display scan signal.

The power circuit may generate a direct current (DC) power and an alternating current (AC) power needed for panel driving, based on control by the timing controller 11. The AC power may be referred to as a system power. The DC power may be power which operates various logic circuits included in the panel driving circuit and the timing controller 11. The power circuit may release the AC power to turn off a display apparatus, based on control by the timing controller 11.

Figure 3:
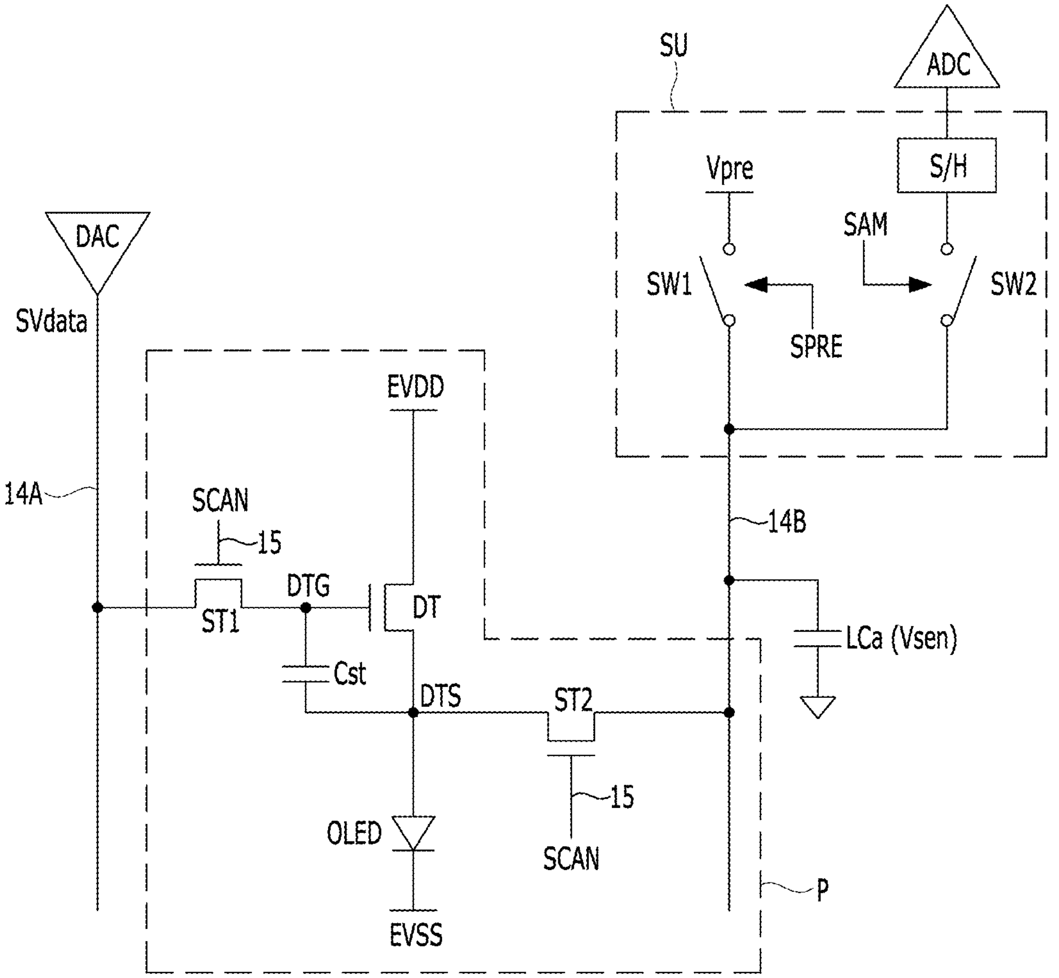
FIG. 3 is a diagram illustrating a connection configuration between a pixel and a sensing circuit according to one embodiment.
Figure 4:
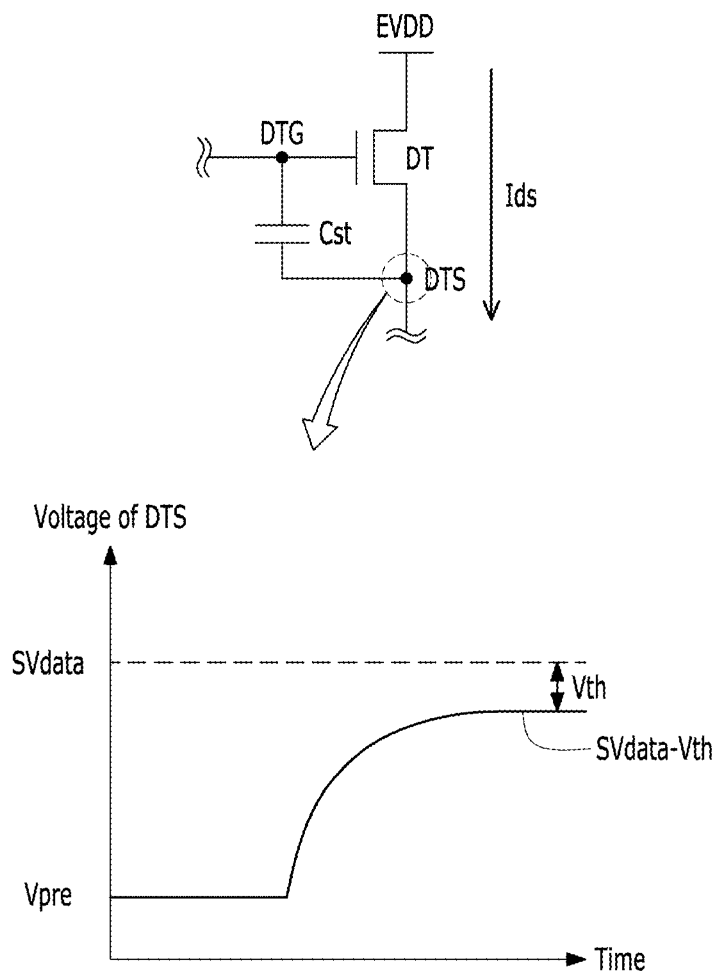
FIG. 4 is a diagram illustrating a source follower operation of a pixel for sensing a threshold voltage of a driving element according to one embodiment.

FIG. 3 is a diagram illustrating a connection configuration between a pixel P and a sensing unit SU according to one embodiment. FIG. 4 is a diagram illustrating a source follower operation of a pixel for sensing a threshold voltage of a driving element according to one embodiment.

Referring to FIG. 3, the pixel P may be implemented in a structure capable of a display operation and an off-sensing operation. The pixel P may include a light emitting device OLED, a driving transistor DT, a storage capacitor Cst, a first switch transistor ST1, and a second switch transistor ST2. The transistors DT, ST1, and ST2 may each be implemented as a thin film transistor (TFT). TFTs may be implemented as a P type, an N type, or a hybrid type where the P type and the N type are provided in common. Also, a semiconductor layer of a TFT may include amorphous silicon, polysilicon, or oxide.

The light emitting device OLED may include an anode electrode connected to a source node DTS, a cathode electrode connected to an input terminal of a low-level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may be a driving element which controls a level of a drain-source current (hereinafter referred to as Ids) of the driving transistor DT input to the light emitting device OLED, based on a gate-source voltage (hereinafter referred to as Vgs) thereof. The driving transistor DT may include a gate electrode connected with a gate node DTG, a drain electrode connected to an input terminal of a high-level driving voltage EVDD, and a source electrode connected to a source node DTS.

The storage capacitor Cst may be connected between the gate node DTG and the source node DTS and may hold the Vgs of the driving transistor DT during a predetermined period.

The first switch transistor ST1 may electrically connect a data line 14A with the gate node DTG, based on a scan signal SCAN from a gate line 15, and may allow a sensing data voltage SVdata to be charged into the gate node DTG. The first switch transistor ST1 may include a gate electrode connected with the gate line 15, a drain electrode connected with the data line 14A, and a source electrode connected with the gate node DTG.

The second switch transistor ST2 may electrically connect the source node DTS with the sensing line 14B, based on the scan signal SCAN, and thus, may allow a reference voltage Vpre to be charged into the source node DTS. Also, the second switch transistor ST2 may allow a source node voltage, corresponding to the Ids of the driving transistor DT, to be charged into a line capacitor Lca of the sensing line 14B. The second switch transistor ST2 may include a gate electrode connected with the gate line 15, a drain electrode connected with the sensing line 14B, and a source electrode connected with the source node DTS.

In the off-sensing mode, as in FIG. 4, the driving transistor DT of the pixel P may operate as a source follower. Based on a source follower operation of the driving transistor DT, a voltage of the source node DTS may increase toward the sensing data voltage Svdata of the gate node DTG from the reference voltage Vpre. An operation of increasing a voltage of the source node DTS may stop at a saturation voltage "Svdata−Vth" where the driving transistor DT is turned off. Because the sensing line 14B is connected to the source node DTS of the driving transistor DT while an off-sensing operation is being performed, the saturation voltage "Svdata−Vth" of the source node DTS may be charged as a sensed voltage Vsen into the line capacitor Lca of the sensing line 14B. A difference between the sensing data voltage Svdata of the gate node DTG and the saturation voltage "Svdata−Vth" of the source node DTS may be a threshold voltage Vth of the driving transistor DT. Accordingly, when the sensed voltage Vsen charged into the line capacitor Lca of the sensing line 14B is sensed, a level of the threshold voltage Vth of the driving transistor DT may be recognized.

Referring to FIG. 3, the sensing unit SU may be implemented as a voltage sensing type.

The sensing unit SU may be for supplying the reference voltage Vpre to the pixel P and sampling the sensed voltage Vsen stored in the line capacitor Lca of the sensing line 14B and may include a reference voltage control switch SW1, a sampling switch SW2, and a sample and holder S/H. The reference voltage control switch SW1 may connect an input terminal of the reference voltage Vpre with the sensing line 14B, based on a reference control voltage signal SPRE. The sampling switch SW2 may connect the sensing line 14B with the sample and holder S/H, based on a sampling control signal SAM. The reference voltage control switch SW1 and the sampling switch SW2 may be turned on/off to be opposite to each other in performing a sensing operation.

When the threshold voltage Vth of the driving transistor DT is shifted for a driving time, a level of the sensed voltage Vsen of the line capacitor Lca may vary. Accordingly, when the sensed voltage Vsen of the line capacitor Lca is sensed and compared with a reference value, a variation of the threshold voltage Vth of the driving transistor DT may be recognized.

The sample and holder S/H may sample and hold a source node voltage "Svdata−Vth" stored in the line capacitor Lca of the sensing line 14B while the sampling switch SW2 is being turned on, and then, may transfer a sampled voltage to the analog-to-digital converter ADC.

Figure 5:
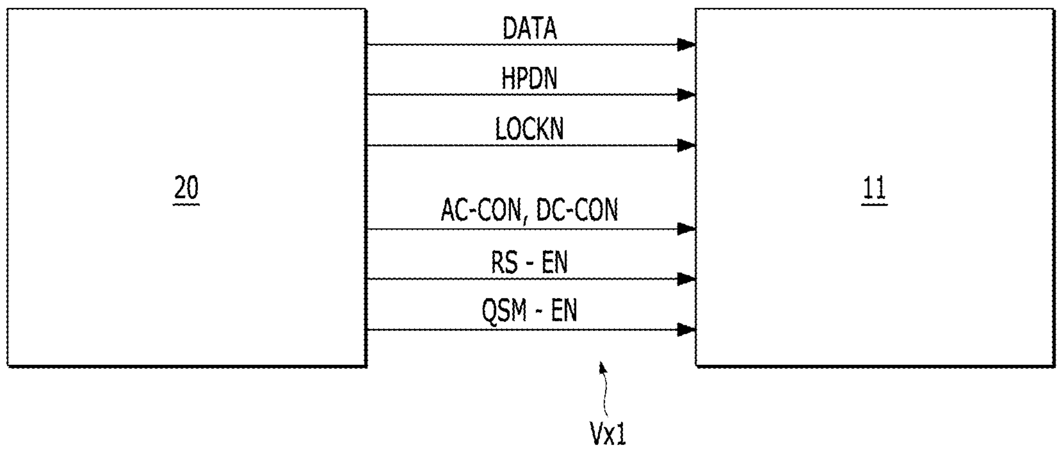
FIG. 5 is a diagram illustrating an interface connection configuration between a host system and a timing controller according to one embodiment.
Figure 6:
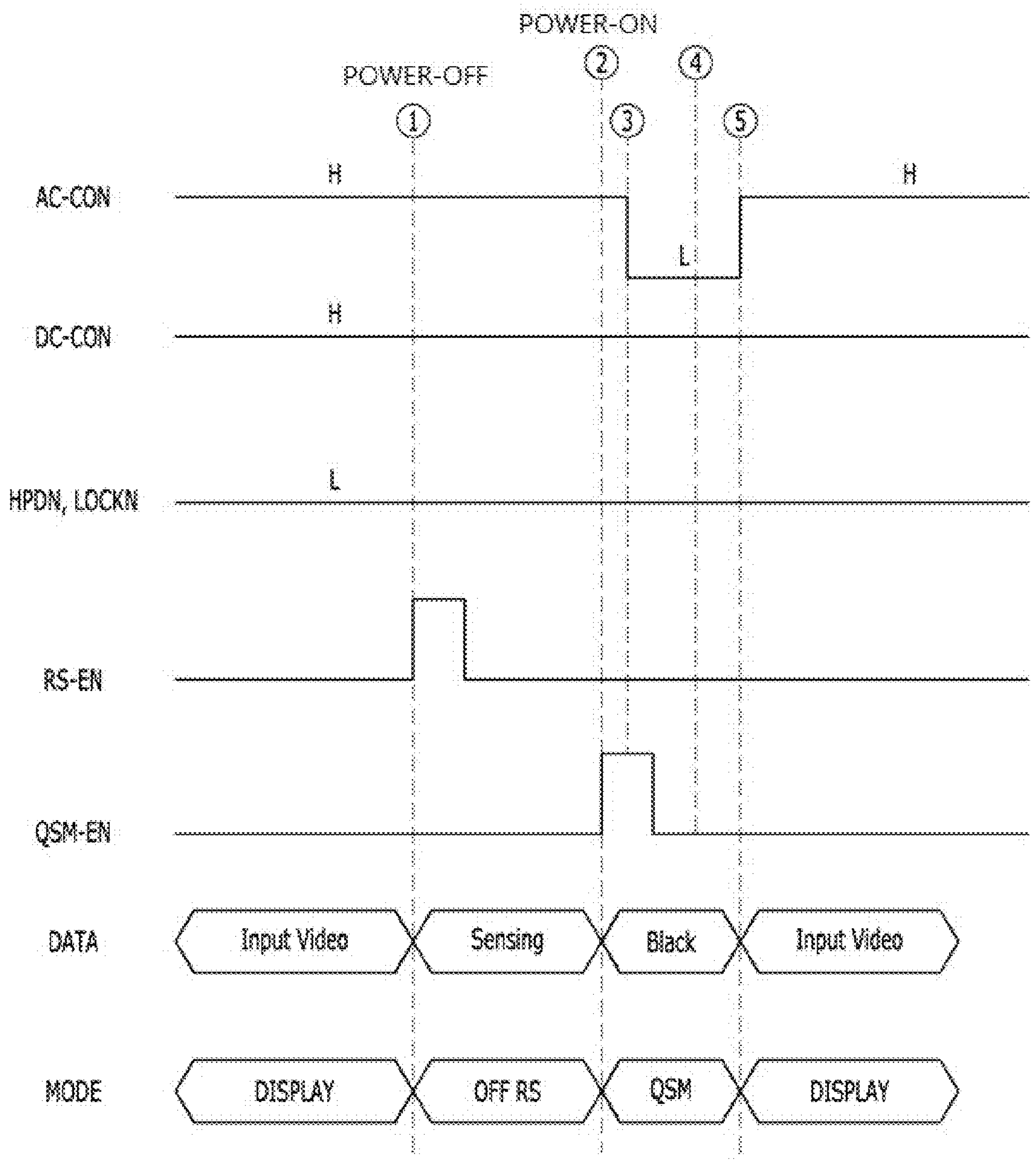
FIG. 6 is a diagram illustrating a driving timing of each of signals transferred and received between a host system and a timing controller according to one embodiment.

FIG. 5 is a diagram illustrating an interface connection configuration between a host system and a timing controller according to one embodiment. FIG. 6 is a diagram illustrating a driving timing of each of signals transferred and received between a host system and a timing controller according to one embodiment.

Referring to FIGS. 5 and 6, a host system 20 may generate a first enable signal RS-EN which is toggled based on an input ① of a power-off command signal to power off the display panel and a second enable signal QSM-EN which is toggled based on an input ② of a power-on command signal to power on the display panel and may output the first enable signal RS-EN and the second enable signal QSM-EN to a timing controller 11. Each of the power-off command signal and the power-on command signal may be a user input signal which is input through a remote controller, but is not limited thereto.

The timing controller 11 may change a display mode to an off-sensing mode OFF RS, based on the first enable signal RS-EN, and when the second enable signal QSM-EN is input while the off sensing mode OFF RS is being performed, the timing controller 11 may stop the off sensing mode OFF RS and may activate a quick start mode QSM.

The start of the off-sensing mode OFF RS may be synchronized (e.g., at a same time) with a toggle timing of the first enable signal RS-EN, and the start of the quick start mode QSM may be synchronized (e.g., at a same time) with a toggle timing of the second enable signal QSM-EN.

The host system 20 may generate a DC power control signal DC-CON needed for driving of a display panel and may further output the DC power control signal DC-CON to the timing controller 11. Also, the host system 20 may further output, to the timing controller 11, a clock data recovery (CDR) lock signal (LOCKN) signal and a hot plug detect signal (HTPDN) signal associated with the data transfer of an input image.

In the quick start mode QSM, the DC power control signal DC-CON may maintain a high logic level H and the LOCKN signal and the HTPDN signal associated with the data transfer of the input image may maintain a low logic level L without being toggled, and thus, a consumed time may be shortened up to a time, at which the display mode restarts, from a time at which the power-on command signal is input ②. That is, the DC power control signal DC-CON maintains a same level (e.g., a high logic level H) during the off sensing mode OFF RS and the quick start mode QSM. As shown in FIG. 6, the DC power control signal DC-CON has the high logic level while the first enable signal RS-EN toggles from the low logic level (e.g., a first level) to a high logic level (e.g., a second level) and the while the second enable signal QSM-EN toggles from the low logic level to the high logic level. As shown in FIG. 6, the DC power control signal DC-CON also has the high logic level during the display mode DISPLAY.

In the quick start mode QSM, the timing controller 11 may control a panel driving circuit so that a black image is displayed on a screen of the display panel. Because the black image is displayed on the screen of the display panel in the quick start mode QSM, a panel initialization operation of restarting the display mode may be effectively implemented.

The host system 20 may generate an AC power control signal AC-CON needed for driving of the display panel and may further output the AC power control signal AC-CON to the timing controller 11.

In the quick start mode QSM, the AC power control signal AC-CON may be toggled from the high logic level H to the low logic level L at a first toggle timing ③. The host system 20 may toggle the AC power control signal AC-CON to allow the timing controller 11 to prepare for a panel stabilization operation. The timing controller 11 may reset the supply of an AC power to initialize panel driving.

At a timing ④ succeeding the first toggle timing ③, the host system 20 may maintain the AC power control signal AC-CON at the low logic level L to notify the timing controller 11 that the restart of the display mode is ready. The AC power control signal AC-CON may be second-toggled from the low logic level L to the high logic level H at a second toggle timing ⑤. The host system 20 may second-toggle the AC power control signal AC-CON to allow the timing controller 11 to restart the display mode.

Referring to FIGS. 5 and 6, the host system 20 and the timing controller 11 may be connected with each other through a V-by-one interface circuit (V×1) and may transfer and receive image data DATA therebetween.

The host system 20 may further output, to the timing controller 11, the LOCKN signal and the HTPDN signal for controlling the transfer of the image data DATA. The host system 20 may control the training and transfer of the image data DATA by using the LOCKN signal and the HTPDN signal.

The host system 20 may transfer the image data DATA to the timing controller 11 while the LOCKN signal and the HTPDN signal are being transferred at the low logic level L. On the other hand, while the LOCKN signal and the HTPDN signal are being transferred at the high logic level H, the host system 20 may not transfer the image data DATA to the timing controller 11 and may block the transfer of the image data DATA. While the LOCKN signal and the HTPDN signal are being transferred at the high logic level H, the host system 20 may supply the timing controller 11 with a CDR training pattern signal and an align training pattern signal instead of the image data DATA.

Because the LOCKN signal and the HTPDN signal maintain the low logic level L without being toggled in the off-sensing mode OFF RS and the quick start mode QSM, the display mode after the quick start mode QSM may quickly restart without being delayed. That is, the LOCKN signal and the HTPDN signal maintain the low logic level L during an entire duration of the off sensing mode OFF RS and an entire duration of the quick start mode QSM.

As described above, the off process according to the present embodiment may include the timings ①, ②, ③, ④, and ⑤ described above. In the off process according to the present embodiment, the DC power may not be cut off and may maintain an active state. Accordingly, even when the power-on command signal is input while the off process is being performed, a screen restart time may be shortened.

In the off process according to the present embodiment, when the power-on command signal is input while the off-sensing mode is being performed, the timing controller 11 may stop an off sensing operation in a non-completion state and may immediately enter the quick start mode, and thus, a screen restart time may be considerably shortened.

Figure 7:
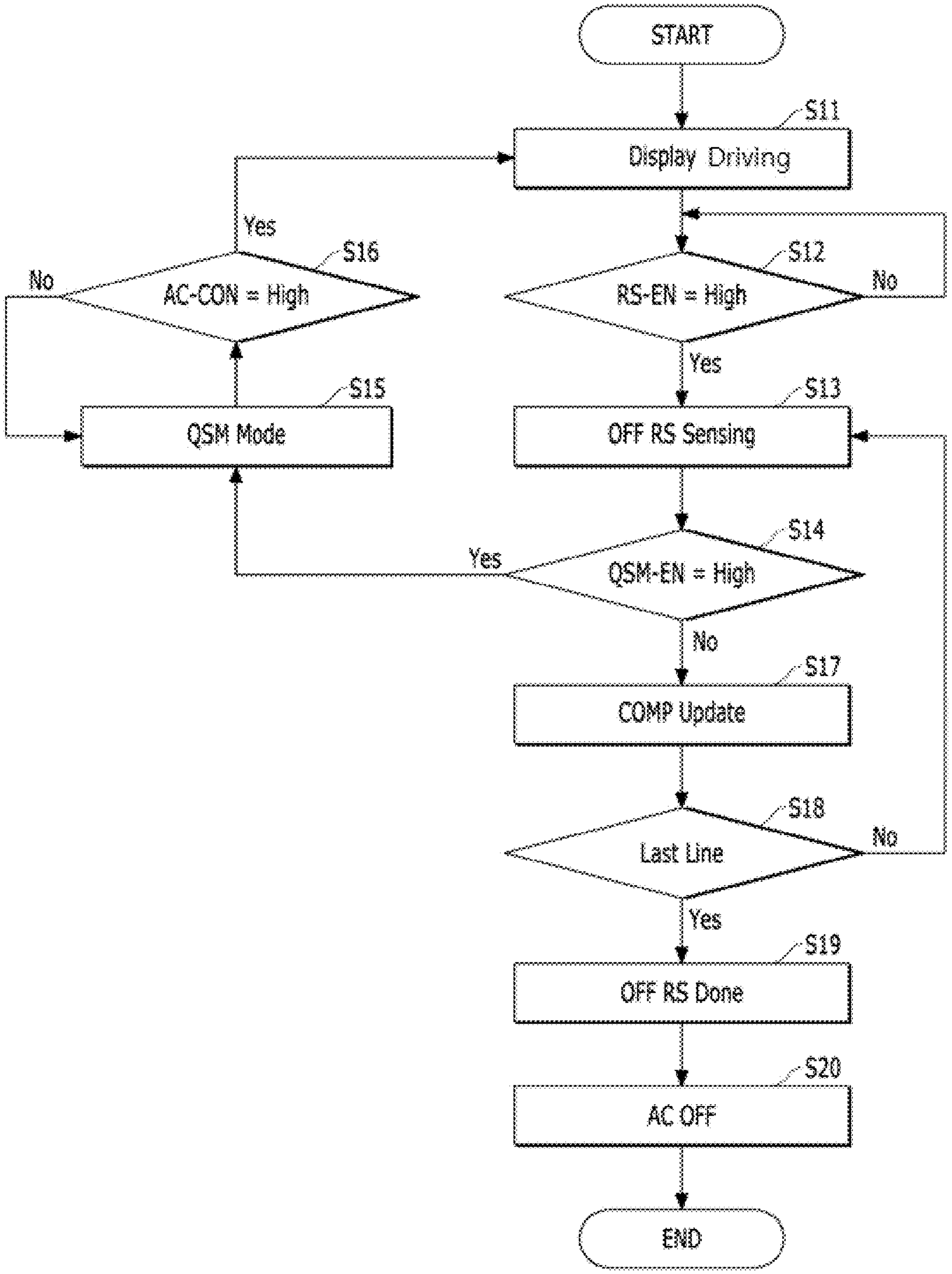
FIG. 7 is a diagram illustrating a driving method of an electroluminescent display apparatus for reducing a screen restart time in a case where a power-on command signal is input while an off process is being performed according to one embodiment.

FIG. 7 is a diagram illustrating a driving method of an electroluminescent display apparatus for reducing a screen restart time in a case where a power-on command signal is input while an off process is being performed.

Referring to FIG. 7, a first enable signal RS-EN toggled based on an input of a power-off command signal may be supplied from a host system to a timing controller in display driving (S11 and S12).

The timing controller may start an off process at a toggle timing (high timing) of the first enable signal RS-EN. That is, the timing controller may change a display mode, which is for displaying an input image on a screen of a display panel, to an off-sensing mode OFF RS for sensing an electrical characteristic value of each of pixels, based on the first enable signal RS-EN (S13).

While the off-sensing mode OFF RS is being performed, a second enable signal QSM-EN toggled based on an input of a power-on command signal may be supplied from the host system to the timing controller (S14).

When toggling (High) of the second enable signal QSM-EN is sensed while the off sensing mode OFF RS is being performed, the timing controller may stop the off sensing mode OFF RS (i.e., stop the off sensing operation in a non-completion state) and may activate a quick start mode QSM (S15).

While the quick start mode QSM is being performed, an AC power control signal AC-CON which is second-toggled from a low logic level L to a high logic level H after being first-toggled from the high logic level H to the low logic level L may be supplied from the host system 20 to the timing controller 11. When first-toggling (Low) of the AC power control signal AC-CON is sensed, the timing controller 11 may reset the supply of an AC power to initialize panel driving, and when second toggling (High) is sensed, the timing controller may restart the display mode (S16). At this time, a DC power (i.e., a logic power) needed for driving of a display panel may not be cut off and may maintain an active state.

Furthermore, when toggling (High) of the second enable signal QSM-EN is not sensed while the off-sensing mode OFF RS is being performed, the timing controller may complete an off sensing operation on all pixel lines to update pixel compensation values (S17 and S18).

When the pixel compensation values corresponding to all pixel lines are updated, the timing controller may complete the off-sensing mode OFF RS and may turn off an AC power (S19 and S20).

The present embodiment may realize the following effects.

In the present embodiment, a screen restart time may be shortened in a case where a power-on command signal is input while an off process is being performed, and thus, the convenience of a user may be enhanced.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An electroluminescent display apparatus comprising:
- a display panel including a plurality of pixels;
- a host system configured to output a first enable signal that is toggled from a first level to a second level responsive to an input of a power-off command signal to power off the display panel and a second enable signal that is toggled from the first level to the second level responsive to an input of a power-on command signal to power on the display panel; and
- a timing controller configured to change a display mode of the display panel during which an input image is displayed by the display panel to an off sensing mode of the display panel during which a threshold voltage of a driving transistor included in each of the plurality of pixels is sensed responsive to the first enable signal toggling from the first level to the second level, and activate a quick start mode of the display panel that stops the off sensing mode responsive to the second enable signal being toggled from the first level to the second level while the off sensing mode is performed.

2. The electroluminescent display apparatus of claim 1, wherein the host system further outputs an alternating current (AC) power control signal that is needed for driving of the display panel to the timing controller, the AC power control signal having a low logic level while the quick start mode is performed and has a high logic level while the display mode and the off sensing mode are performed.

3. The electroluminescent display apparatus of claim 2, wherein the timing controller restarts the display mode in synchronization with a timing at which the AC power control signal changes from the low logic level to the high logic level.

4. The electroluminescent display apparatus of claim 1, wherein the host system further outputs a direct current (DC) power control signal that is needed for driving of the display panel to the timing controller, the DC power control signal maintaining a high logic level while the off sensing mode and the quick start mode are performed.

5. The electroluminescent display apparatus of claim 4, wherein the timing controller maintains power of a logic circuit in an on state that drives the display panel while the quick start mode is performed based on the DC power control signal having the high logic level.

6. The electroluminescent display apparatus of claim 1, wherein the host system and the timing controller are connected with each other through an interface circuit that operates in accordance with a V-by-one digital signaling standard.

7. The electroluminescent display apparatus of claim 6, wherein the host system further outputs a first signal that transfers a clock data recovery training pattern signal and a second signal that transfers an align training pattern signal to the timing controller, and the first signal and the second signal maintain a low logic level during an entire duration of the off sensing mode and an entire duration of the quick start mode.

8. The electroluminescent display apparatus of claim 7, wherein the host system outputs data of the input image to the timing controller without stopping during the off sensing mode and the quick start mode.

9. A driving method of an electroluminescent display apparatus including a host system, a timing controller, and a display panel including a plurality of pixels, the driving method comprising:
- outputting, by the host system to the timing controller, a first enable signal that is toggled from a first level to a second level responsive to an input of a power-off command signal to power off the display panel and a second enable signal that is toggled from the first level to the second level responsive to an input of a power-on command signal to power on the display panel; and
- changing, by the timing controller, a display mode of the display panel during which an input image is displayed by the display panel to an off sensing mode of the display panel during which a threshold voltage of a driving transistor included in each of the plurality of pixels is sensed responsive to the first enable signal toggling from the first level to the second level, and activating a quick start mode of the display panel that stops the off sensing mode responsive to the second enable signal being toggled from the first level to the second level while the off sensing mode is performed.

10. The driving method of claim 9, further comprising:

outputting, by the host system, an alternating current (AC) power control signal that is needed for driving of the display panel to the timing controller, the AC power control signal having a low logic level while the quick start mode is performed and has a high logic level while the display mode and the off sensing mode are performed.

11. The driving method of claim 10, wherein the timing controller restarts the display mode in synchronization with a timing at which the AC power control signal changes from the low logic level to the high logic level.

12. The driving method of claim 9, further comprising:

outputting, by the host system, a direct current (DC) power control signal that is needed for driving the display panel to the timing controller, the DC power control signal maintaining a high logic level while the off sensing mode and the quick start mode are performed.

13. The driving method of claim 12, wherein the timing controller maintains power of a logic circuit in an on state that drives the display panel while the quick start mode is performed based on the DC power control signal having the high logic level.

14. The driving method of claim 9, further comprising:

outputting, by the host system, a first signal that transfers a clock data recovery training pattern signal and a second signal that transfers an align training pattern signal to the timing controller, the first signal and the second signal maintaining a low logic level during an entire duration of the off sensing mode and an entire duration of the quick start mode.

15. The driving method of claim 14, further comprising:

outputting, by the host system, data of the input image to the timing controller during the off sensing mode and the quick start mode.

16. A display device comprising:

a display panel including a plurality of pixels;

a host system configured to output a first enable signal that is toggled from a first level to a second level based on an input of a power-off command signal to power off the display panel, a second enable signal that is toggled from the first level to the second level based on an input of a power-on command signal to power on the display panel, and a direct current (DC) power control signal; and a timing controller configured to change a display mode of the display panel during which an input image is displayed by the display panel to an off sensing mode of the display panel during which a threshold voltage of a driving transistor included in each of the plurality of pixels is sensed responsive to the first enable signal toggling from the first level to the second level, and activate a quick start mode of the display panel that stops the off sensing mode and switches to the display mode responsive to the second enable signal being toggled from the first level to the second level while the off sensing mode is performed, wherein the DC power control signal maintains a same level during the off sensing mode and the quick start mode, the level of the DC power control signal required for driving the display panel.

17. The display device of claim 16, wherein the level of the DC power control signal is a high logic level and the DC power control signal has the high logic level while the first enable signal toggles from the first level to the second level and while the second enable signal toggles from the first level to the second level.

18. The display device of claim 17, wherein the DC power control signal has the high logic level during the display mode.

19. The display device of claim 16, wherein the DC power control signal having a high logic level maintains power of a logic circuit in an on state, the logic circuit driving the display panel while the quick start mode is performed.

20. The display device of claim 16, wherein the host system further outputs an alternating current (AC) power control signal to the timing controller, the AC power control signal having a low logic level while the quick start mode is performed and has a high logic level while the display mode and the off sensing mode are performed.

21. The display device of claim 20, wherein the timing controller restarts the display mode from the quick start mode in synchronization with a timing at which the AC power control signal changes from the low logic level to the high logic level.

22. The display device of claim 16, wherein the host system and the timing controller are connected with each other through an interface circuit that operates in accordance with a V-by-one digital signaling standard.

23. The display device of claim 22, wherein the host system further outputs a first signal that transfers a clock data recovery training pattern signal and a second signal that transfers an align training pattern signal to the timing controller, and the first signal and the second signal maintain a low logic level during an entire duration of the off sensing mode and an entire duration of the quick start mode.

24. The display device of claim 23, wherein the host system outputs data of the input image to the timing controller without stopping during the off sensing mode and the quick start mode.

* * * * *